United States Patent
Kabuto

(10) Patent No.: US 9,848,185 B2
(45) Date of Patent: Dec. 19, 2017

(54) VIDEO DISPLAY SYSTEM, DISPLAY DEVICE AND SOURCE DEVICE

(75) Inventor: Nobuaki Kabuto, Kunitachi (JP)

(73) Assignee: HITACHI MAXELL, LTD., Osaka (JP)

( * ) Notice: Subject to any disclaimer, the term of this patent is extended or adjusted under 35 U.S.C. 154(b) by 639 days.

(21) Appl. No.: 13/164,105

(22) Filed: Jun. 20, 2011

(65) Prior Publication Data

US 2012/0033044 A1    Feb. 9, 2012

(30) Foreign Application Priority Data

Aug. 6, 2010    (JP) ................................ 2010-176923

(51) Int. Cl.
H04N 13/04    (2006.01)
H04N 13/00    (2006.01)

(52) U.S. Cl.
CPC ..... *H04N 13/0454* (2013.01); *H04N 13/0055* (2013.01); *H04N 13/0066* (2013.01); *H04N 13/04* (2013.01); *H04N 13/0452* (2013.01)

(58) Field of Classification Search
None
See application file for complete search history.

(56) References Cited

U.S. PATENT DOCUMENTS

| | | | | |
|---|---|---|---|---|
| 2004/0013406 A1* | 1/2004 | Barton et al. | | 386/69 |
| 2005/0262533 A1* | 11/2005 | Hart et al. | | 725/40 |
| 2009/0142041 A1* | 6/2009 | Nagasawa | H04N 13/0033 | 386/341 |
| 2009/0220213 A1* | 9/2009 | Ogawa et al. | | 386/95 |
| 2009/0324202 A1* | 12/2009 | Okubo et al. | | 386/95 |
| 2010/0008636 A1* | 1/2010 | Ohno | | 386/46 |
| 2010/0046910 A1* | 2/2010 | Lim | H04N 5/765 | 386/207 |

(Continued)

FOREIGN PATENT DOCUMENTS

| | | | | |
|---|---|---|---|---|
| EP | 2448273 A2 * | 5/2012 | ......... | G06K 9/00711 |
| JP | 2003-333624 | 11/2003 | | |

(Continued)

OTHER PUBLICATIONS

Japanese Office Action issued in Japanese Application No. 2010-176923 dated Oct. 22, 2013.

*Primary Examiner* — Mohammed Rahaman
*Assistant Examiner* — William Adrovel
(74) *Attorney, Agent, or Firm* — McDermott Will & Emery LLP

(57) ABSTRACT

A video display system includes a source device for reproducing and outputting contents; and a display device for displaying contents which is output from the source device. Upon receiving a message for requesting display of a 3D video from the source device in a state of unreadiness to display the 3D video, the display device transmits a message for stopping reproduction of 3D contents to the source device. Upon receiving the message for stopping reproduction of 3D contents, the source device stops reproduction of the 3D contents. Upon completing preparations for displaying the 3D video, the display device transmits a message for reproducing the 3D contents to the source device. Upon receiving the message for reproducing the 3D contents, the source device reproduces and outputs the 3D contents.

8 Claims, 5 Drawing Sheets

(56) References Cited

U.S. PATENT DOCUMENTS

| | | | | |
|---|---|---|---|---|
| 2010/0165079 A1* | 7/2010 | Yamada | ........................... | 348/43 |
| 2010/0321479 A1* | 12/2010 | Yang | ............................... | 348/51 |
| 2011/0012896 A1* | 1/2011 | Ji | ................................. | 345/419 |
| 2011/0032330 A1* | 2/2011 | Kim et al. | ....................... | 348/43 |
| 2011/0078737 A1* | 3/2011 | Kanemaru et al. | ............. | 725/40 |
| 2011/0090304 A1* | 4/2011 | Song | ............................... | 348/42 |
| 2011/0157310 A1 | 6/2011 | Mitani et al. | | |
| 2011/0320941 A1* | 12/2011 | Jain | ............................... | 715/705 |

FOREIGN PATENT DOCUMENTS

| | | |
|---|---|---|
| JP | 2006-118877 A | 5/2006 |
| JP | 2009-250987 A | 10/2009 |
| JP | 2009-296118 A | 12/2009 |
| JP | 2010-016490 A | 1/2010 |
| WO | 2010/026736 A1 | 3/2010 |

\* cited by examiner

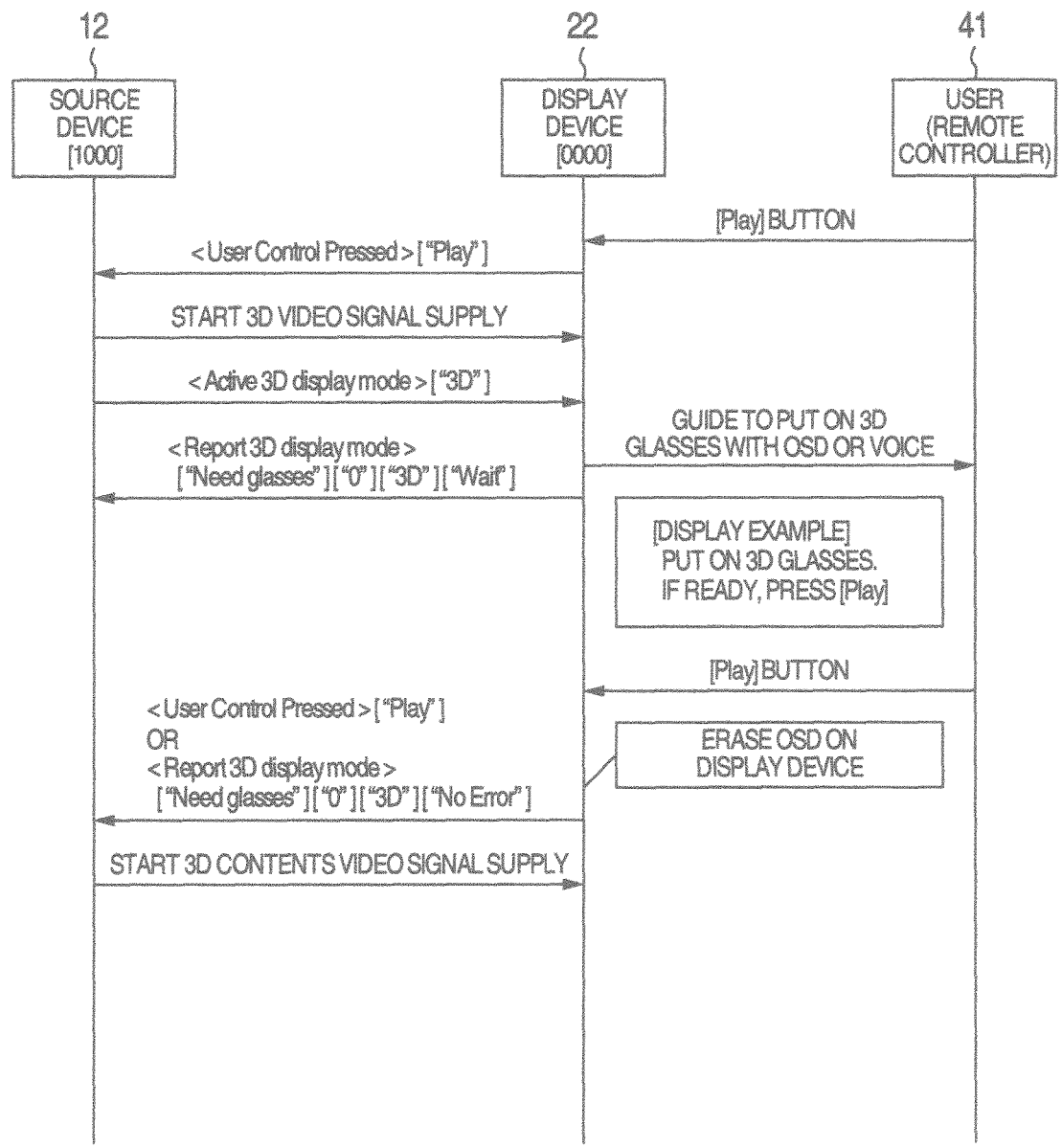

FIG.3

| Opcode | Parameters | Parameter description | Response |
|---|---|---|---|
| <Activate 3D display> | [3D activate] | The requested display mode | <Report 3D display> |
| <Report 3D display> | [3D mode] | The current display mode | - |

FIG.4

| Name | Range Description | | Length | Purpose |
|---|---|---|---|---|
| [3D activate] | "2D" | 0 | 1 byte | Set 2D display mode |
| | "3D" | 1 | | Set 3D display mode |
| | "No change" | 3 | | A source wants to know the TV status. |
| [3D mode] | [3D Glass] [Multi View] [3D setting] [3D Error] | | 1 byte | |
| [3D Glass] | "Not need glasses" | 0 | 1 bit | |
| | "Need glasses" | 1 | | |
| [Multi View] | (The number of multi view) -2 | | 4 bits | Stereoscopic display takes "0". It takes "15" when display has 17 or more view. |
| [3D setting] | "2D" | 0 | 1 bit | Display at 2D mode |
| | "3D" | 1 | | Display at 3D mode |
| [3D Error] | "No error" | 0 | 2 bits | Continue 3D video |
| | "Wait" | 1 | | Wait to play 3D contents till the reception of "No error". ex. TV is encouraging an user to put on glasses. |
| | "no 3D video" | 2 | | No 3D video detected |
| | "Other error" | 3 | | |

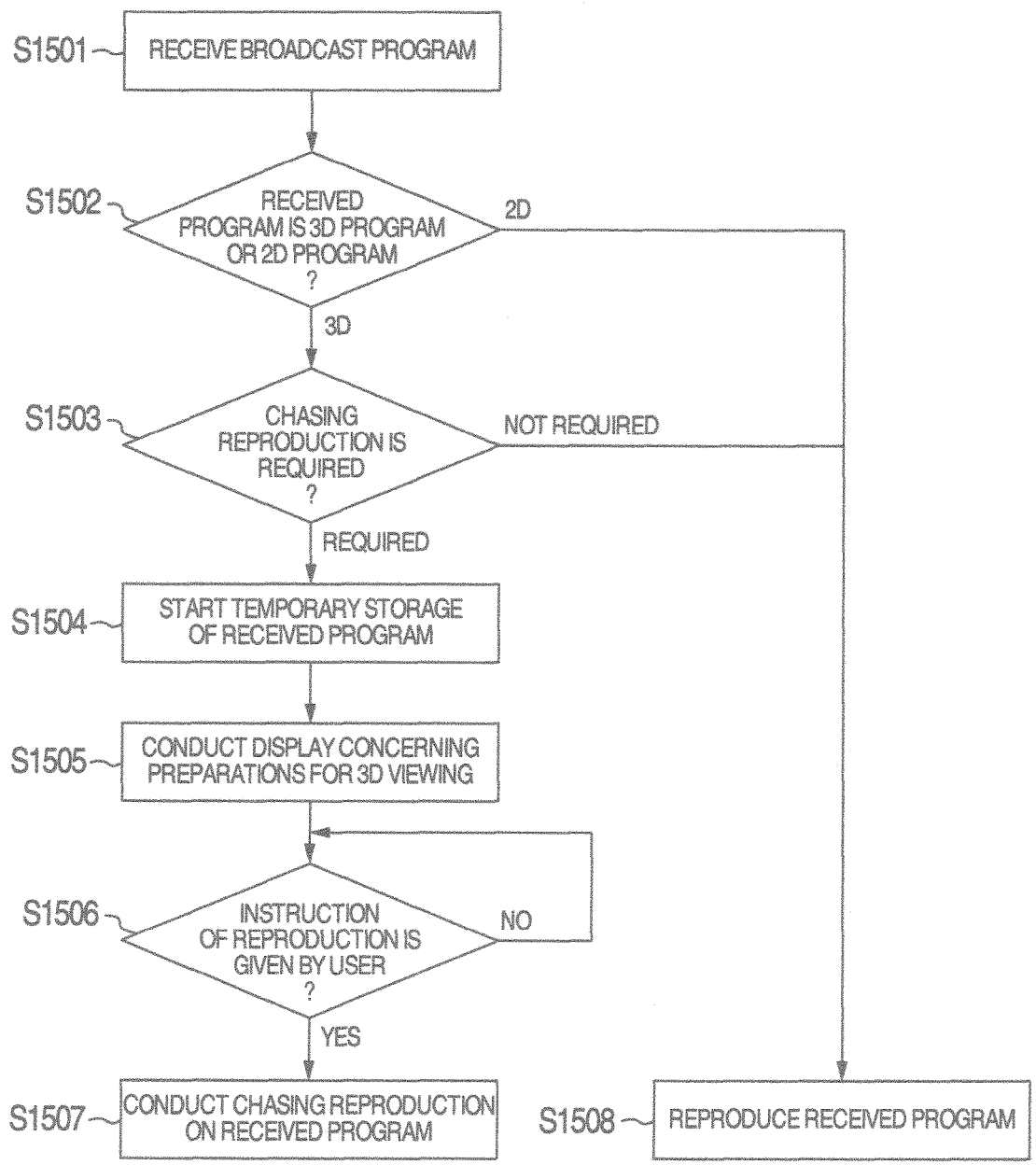

VIDEO DISPLAY SYSTEM, DISPLAY DEVICE AND SOURCE DEVICE

INCORPORATION BY REFERENCE

The present application claims priority from Japanese application JP2010-176923 filed on Aug. 6, 2010, the content of which is hereby incorporated by reference into this application.

BACKGROUND OF THE INVENTION

The present invention relates to transmission and reception of a video signal.

In JP-A-2003-333624, the problem to be solved is to "enable a user to enjoy a 2D displayed image and a 3D displayed image respectively from the first." And its solution is to provide a discrimination part for discriminating which of an image for 2D display and image data for 3D display application data to be displayed on a display part is and display a discrimination result in the discrimination part before display of the application data on the display part.

SUMMARY OF THE INVENTION

According to JP-A-2003-333624, "as a technique for conducting 3D display, there is a scheme which enables stereoscopy by using special glasses or a parallax barrier scheme or a lenticular lens scheme which enables autostereoscopic view" and "for stereoscopically viewing a 3D displayed image, it is necessary for the user to put on special glasses for 3D viewing or conduct an action for adjusting a viewing position to stereoscopically view the 3D displayed image." As described in this way, adjustments according to respective 3D display schemes become necessary to suitably view the displayed image.

JP-A-2003-333624 intends for an apparatus obtained by integrating a 3D display device and a video signal source device of "an electronic video recording and reproducing device having a display device capable of recording and reproducing a 3D image" as one body. Therefore, a 3D display scheme of the 3D display device is determined beforehand. With respect to precautions concerning viewing of a 3D displayed image, therefore, the video signal source device has a configuration which displays only predetermined precautions concerning the 3D display.

If the 3D display device and the video signal source device are separated from each other, however, the video signal source device cannot discriminate the 3D display scheme of the display device connected to the video signal source device and there is a fear that the video signal source device might not be able to output the precautions concerning viewing of the 3D displayed image to the 3D display device.

According to an aspect of the present invention, the above-described problems are solved by a configuration in which upon being supplied with 3D contents including a 3D video from a source device, a display device transmits a message to the source device to stop reproduction of the 3D contents and displays a message to prompt a user to make preparations for 3D video viewing, and upon receiving an instruction for reproducing the 3D contents from the user, the display device transmits a message to the source device to reproduce the 3D contents.

According to the above-described configuration, it becomes possible to promote suitable viewing of 3D contents and it is possible to provide an apparatus which is convenient for the user to use.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an example of transmission and reception of a message in a video system;

FIG. 3 is a table showing an example of a message in a video system;

FIG. 4 is a table showing an example of an argument of a message in a video system;

FIG. 6 is a flow chart showing an example of processing in a video transmission system.

DESCRIPTION OF THE EMBODIMENTS

Hereafter, embodiments will be described. In the ensuing embodiments, "3D" means 3-dimensional and "2D" means 2-dimensional. For example, "3D video" means a video which makes it possible for the viewer to perceive a certain object stereoscopically as if it exists in the same space as the viewer by presenting videos having parallax to left and right eyes. Furthermore, for example, "3D display device" is a display device capable of displaying a 3D video. Furthermore, for example, "3D contents" are contents containing a video signal which makes it possible to display a 3D video in processing conducted by the 3D display device.

First Embodiment

Figure 1:
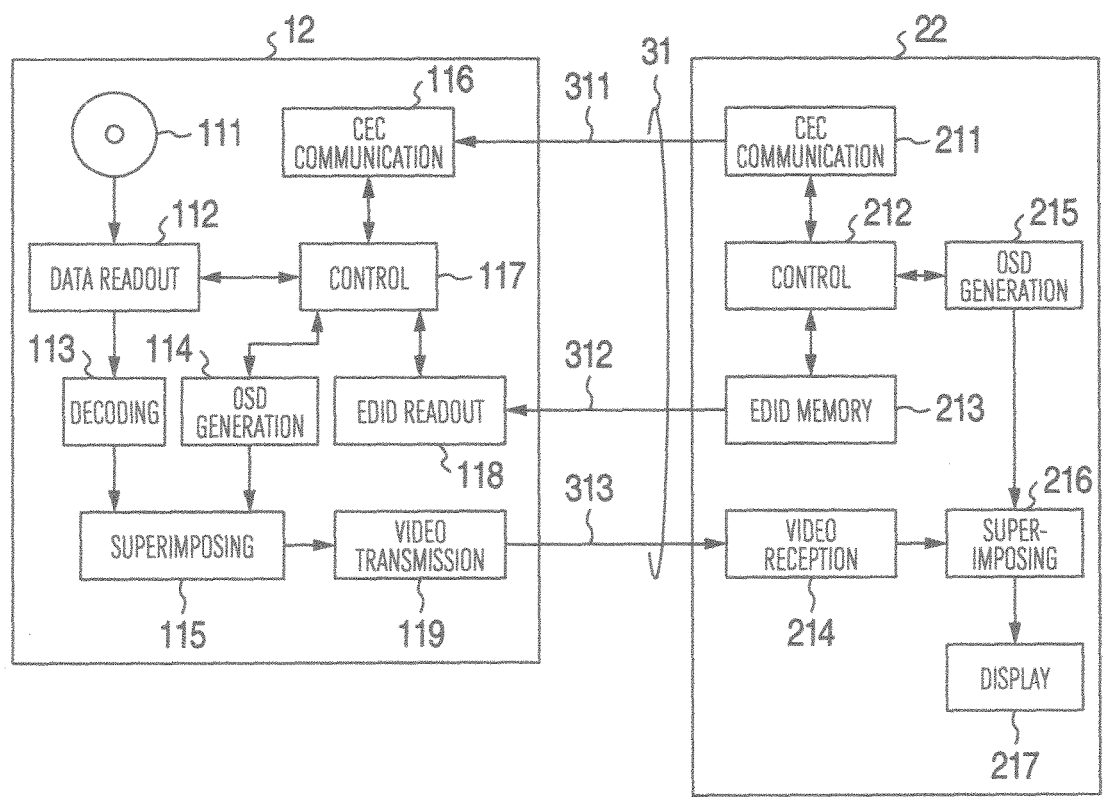
FIG. 1 is a block diagram showing an example of a video system.

FIG. 1 is a block diagram showing a video transmission system in the present embodiment. A video signal source device 12 is connected to a 3D display device 22 via an HDMI (High Definition Multimedia Interface, a trademark of HDMI, LLC) cable 31. The video signal source device 12 is, for example, a DVD player, a DVD recorder, a Blu-ray Disc player, a Blu-ray Disc recorder, an HDD recorder, or the like. The video signal source device 12 includes storage media 111 such as an optical disc, a magnetic recording disc, or a semiconductor memory, a data readout unit 112, a decoding unit 113, an OSD (On Screen Display) generation unit 114, a video signal superimposing unit 115, a CEC (Consumer Electronics Control) communication unit 116, a control unit 117, an EDID (Extended Display Identification Data) readout unit 118, and a video transmission unit 119. By the way, the recoding media 111 may be incorporated in the video signal source device 12 or may be attachable and detachable.

In the video signal source device 12, video data which is read out from the storage media 111 by the data readout unit 112 is decoded by the decoding unit 113. The decoded video data and an OSD generated by the OSD generation unit 114 as occasion demands are superimposed by the video signal superimposing unit 115 and output from the video transmission unit 119.

The 3D display device 22 is a display capable of displaying a 3D video. The 3D display device 22 is a display device which includes, for example, a liquid crystal display, a plasma display, an organic EL display or the like. The 3D display device 22 includes a CEC communication unit 211, a control unit 212, an EDID memory unit 213, a video reception unit 214, an OSD generation unit 215, a video signal superimposing unit 216, and a display unit 217. By the way, the 3D display device 22 may have a configuration including a tuner, a descrambler, a demultiplexer, and a decoder which process a broadcast wave received by an antenna.

In the 3D display device 22, video data received by the video reception unit 214 is displayed by the display unit 217. Furthermore, it is also possible to cause the video signal superimposing unit 216 to superimpose an OSD image generated by the OSD generation unit 215 with video data received by the video reception unit 214 and cause the display unit 217 to display a resultant image.

As a method for displaying a 3D video in the 3D display device 22, there are an anaglyph scheme, a polarization display scheme, a frame sequential scheme, a parallax barrier scheme, a lenticular lens scheme, a microlens array scheme, and a light ray reproducing scheme.

In the anaglyph scheme, videos picked up from different angles on the left and right sides are reproduced respectively with red and green light rays overlapped and the videos are viewed with glasses (hereafter referred to as "anaglyph glasses" as well) having red and blue color filters on the left and right sides.

In the polarization display scheme, orthogonal linear polarizations are applied to left and right videos to conduct overlapped projections and they are separated by using glasses (hereafter referred to as "polarization glasses") having polarization filters.

In the frame sequential scheme, videos picked up from different angles on the left and right sides are reproduced alternately and the videos are viewed with glasses (hereafter referred to as shutter glasses as well) having liquid crystal shutters to shade the left and right fields of vision alternately.

In the parallax barrier scheme, a video for the right eye is viewed with the right eye and a video for the left eye is viewed with the left eye by laying a barrier of a longitudinal stripe called "parallax barrier" on the display. The user need not put on special glasses or the like. The parallax barrier scheme can also be further classified into a two view point scheme in which the viewing position is comparatively narrow and a multiple view point scheme in which the viewing position is comparatively wide.

In the lenticular lens scheme, a video for the right eye is viewed with the right eye and a video for the left eye is viewed with the left eye by laying a lenticular lens on the display. The user need not put on special glasses or the like. The lenticular lens scheme can also be further classified into a two view point scheme in which the viewing position is comparatively narrow and a multiple view point scheme in which the viewing position is comparatively wide horizontally.

In the microlens array scheme, a video for the right eye is viewed with the right eye and a video for the left eye is viewed with the left eye by laying a microlens array on the display. The user need not put on special glasses or the like. The microlens array scheme is a multiple view point scheme in which the viewing position is comparatively wide vertically and horizontally.

The light ray reproducing scheme is a scheme in which parallax images are presented to the viewer by reproducing the wave front of light rays. The user need not put on special glasses or the like. Furthermore, the viewing position is also comparatively wide.

By the way, the display scheme of the 3D video is an example, and a scheme other than those described above may be adopted. Furthermore, tools or devices required to view the 3D video, such as the anaglyph glasses, polarization glasses, and shutter glasses are collectively referred to as 3D glasses, 3D viewing devices or 3D viewing assistance devices.

The HDMI cable 31 includes a CEC line 311, a DDC (Display Data Channel) line 312 and a TMDS (Transition Minimized Differential Signaling) line 313.

The HDMI and High-Definition Multimedia Interface is a trademark of HDMI Licensing, LLC, and it is one of a digital interface of the video and audio signal. The CEC provides a function of exercising control between video devices using bidirectional communication possessed by the HDMI. The EDID is a description data form which indicates a reception display capability of a display device and which is established by VESA (Video Electronics Standards Association), and it is adopted in the HDMI. The TMDS is a differential transmission scheme of digital data adopted by the HDMI. In the ensuing description, the HDMI is taken as an example. However, the configuration can be implemented in other video digital interfaces as well in the same way.

In an embodiment described hereafter, the video signal source device 12 instructs the 3D display device 22 to display a 3D video through the CEC, and the 3D display device 22 conveys the current 3D display state to the video signal source device 12 in real time through the CEC. As a result, a more accurate and intelligible guide display or guide voice is given to the user.

FIG. 3 shows definition examples of messages newly added to the CEC, and FIG. 4 shows definition examples of arguments of the messages. Hereafter, operation in the present embodiment will be described by using an example of transmission and reception of messages shown in FIG. 2.

A user 41 presses a [play] button (which is a button for instructing reproduction of contents and which is referred to as reproduction button as well) on a remote controller of the 3D display device 22. Upon receiving its infrared light, the control unit 212 in the 3D display device 22 controls the CEC communication unit 211 to convey a remote control code [Play] to the video signal source device 12 through the CEC line 311 in the HDMI cable 31 by using a <User Control Pressed> ["Play"] message. Here, < > represents an instruction code, and [ ] represents an argument. This message is a standard message of the HDMI.

If the CEC communication unit 116 in the video signal source device 12 receives the message, then the control unit 117 controls respective blocks, the data readout unit 112 reads out video data of an introduction part of 3D contents from the storage media 111, and the decoding unit 113 conducts decoding to a 3D video signal and outputs a video signal of 3D format from the video transmission unit 119 to the TMDS line 313 in the HDMI cable 31 via the video signal superimposing unit 115.

Or the OSD generation unit 114 may generate a 3D video signal and output the video signal of 3D format from the video transmission unit 119 to the TMDS line in the HDMI cable 31 via the video signal superimposing unit 115.

Upon receiving the video signal of the 3D format in the video reception unit 214, the 3D display device 22 displays the video signal on the display unit 217 via the video signal superimposing unit. As for this display, whether to continue the 2D display state or automatically switch to the 3D display state when the 3D display device has received the video signal of the 3D format varies depending upon the user setting in the 3D display device or the design in the display device manufacturer. In the present embodiment, any method may be adopted.

Concurrently with starting output of the video signal of 3D format, the video signal source device 12 sends an <Activate 3D display mode> ["3D"] message to the 3D display device 22 to request to set the 3D display device 22 to the 3D display state. This message uses an instruction code and an argument in the present invention defined in FIGS. 3 and 4.

If the 3D display device requested to be in the 3D display state is already in the 3D display state, the 3D display device omits the guide display or guide voice to the user 41. If the 3D display device 22 newly shifts from the 2D state to the 3D display state, however, the 3D display device 22 provides the user 41 with a guide display or a guide voice such as "put on 3D glasses."

In the case of the guide display, the OSD generation unit 215 generates a video signal for guide display and then the video signal superimposing unit 216 superimposes the video signal for guide display with the video signal which is input from the video signal source device 12, and the display unit 217 displays a resultant signal. In the case of the guide voice, a voice generated by the voice generation unit is reproduced by a speaker, although not illustrated.

The 3D display device 22 provides the user 41 with a guide display or a guide voice. At the same time, the 3D display device 22 replies to the video signal source device 12 with a <Report 3D display mode> ["Need glasses"] ["0"] ["3D"] ["Wait"] message to cause the video signal source device 12 to wait to reproduce 3D contents and thereby secure a time period required for the user to make preparations for 3D video viewing, such as putting on 3D glasses. This message also uses an instruction code and an argument according to the present invention which are defined in FIGS. 3 and 4.

The video signal source device 12 waits without starting reproduction of 3D contents, or waits by displaying an introductory part of 3D contents as a still picture or repetitively.

If the user 41 is ready for viewing a 3D video by, for example, putting on 3D glasses, the user 41 presses [Play] on the remote controller. Upon receiving its infrared light, the 3D display device 22 conveys the remote control code [Play] to the video signal source device 12 with a <User Control Pressed> ["Play"] message. The video signal source device 12 starts reproduction of 3D contents and outputs a 3D video signal to the 3D display device 22.

If the 3D display device 22 conducts a guide which causes the user to press another predetermined button such as a "determine" button instead of the guide display or a guide voice which causes the user to press the [Play] button, the button pressed by the user 41 when preparations for 3D viewing are completed should be a button conformed to the guide. In this case, a message for instructing contents reproduction may be a massage which conveys the above-described remote control code [Play], or may be <Report 3D display mode> ["Need glasses"] ["0"] ["3D"] ["No Error"] which means that preparations for transition to the 3D display state are completed.

The foregoing description has been made by taking the case of the 3D display device of a scheme which needs 3D glasses as an example. According to a definition table shown in FIG. 3, the 3D display device can recognize the 3D display scheme of the 3D display device and the current 2D/3D changeover state itself even in the case of the autostereoscopic scheme which does not need 3D glasses or the case where 2D/3D is changed over in display. As a result, a suitable guide display or guide voice for 3D viewing can be provided, and a 3D display device which can be used by the user conveniently can be implemented. Furthermore, since the video signal source device can know the situation of preparations of the user of the 3D display device for viewing the 3D video in real time by means of communication, an advantage that more accurate preparations for contents reproduction can be made is brought about.

For example, in the case of the autostereoscopic scheme, the display of the guide to putting on 3D glasses may be replaced by a guide display or a guide voice for conveying that the viewing range is narrow and urging movement to a position where 3D display is seen favorably. Furthermore, in a 3D display device capable of 2D/3D display changeover, a guide display or a guide voice for conveying that 2D display state is set by user setting or the like and urging changeover to the 3D display state may be used.

If in this case the user dares to select continuation of the 2D display state, then the 3D display device may send <Report 3D display mode> ["Not need glasses"] ["4"] ["3D"] ["No Error"] to request a 3D video signal. Although the 3D display device may send <Report 3D display mode> ["Not need glasses"] ["4"] ["2D"] ["No Error"], there is a possibility in this case that the 3D video output will be canceled if 3D contents have a flag for inhibiting the 2D display stare.

The foregoing description has been made by taking the CEC communication messages as an example. Similar operations and effects can also be expected in communication messages through the Ethernet (trademark) defined in the HDMI. By using the Ethernet channel, communication in a time period which is shorter as compared with the CEC becomes possible and a 3D system which is more excellent in responsiveness of 2D/3D changeover as compared with the CEC can be constructed.

Second Embodiment

Figure 5:
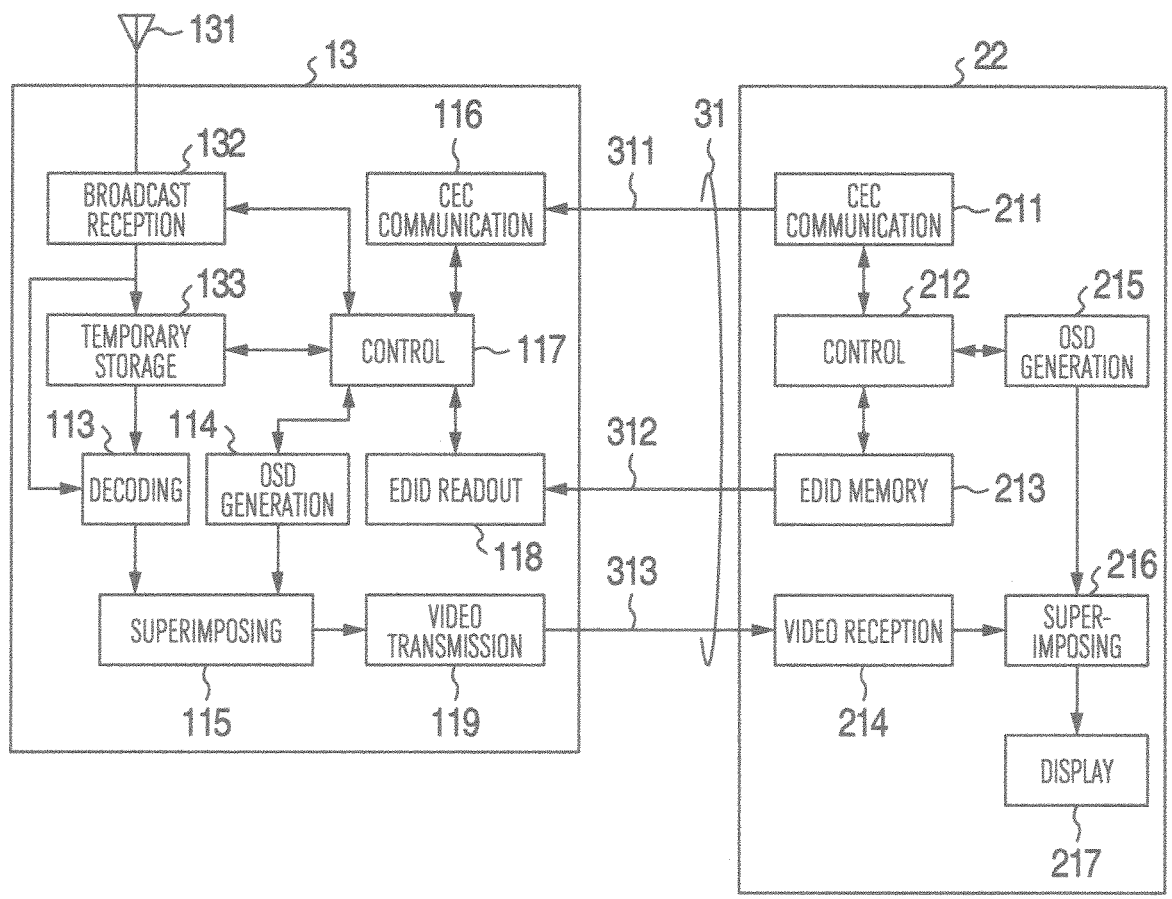
FIG. 5 is a block diagram showing an example of a video system.

FIG. 5 is a block diagram showing a second embodiment. A video signal source device 13 capable of receiving a broadcast and the 3D display device 22 are connected to each other via the HDMI cable 31. Parts having the same functions as those in the block diagram shown in FIG. 1 are denoted by like reference numerals. FIG. 5 differs from FIG. 1 in that a broadcast reception unit 132 connected to an antenna 131 which receives a broadcast radio wave and a temporary storage unit 133 which temporarily stores data received by the broadcast reception unit 132.

If preparations (such as, for example, putting on 3D glasses or adjusting the viewing position) for viewing a 3D video are needed, it is desirable for the user to wait to reproduce 3D contents until the preparations are complete. In the first embodiment, after display concerning the 3D viewing requisite is conducted, an instruction to reproduce given by the user is waited for to reproduce 3D contents. In the case where 3D contents are received and reproduced via a broadcast wave, however, reproducing the contents cannot be stopped temporarily. Therefore, there is a fear that a beginning part of the 3D contents might be overlooked while making preparations for viewing the 3D contents.

Therefore, the present embodiment is configured to make it possible to view 3D contents from the beginning by providing the temporary storage unit 133, temporarily storing 3D contents received via a broadcast wave until the 3D viewing requisite is satisfied and conducting time shift reproduction after the 3D viewing requisite is satisfied.

Hereafter, an example of processing in the present embodiment will be described with reference to FIG. 6.

At step 1501, the broadcast reception unit 132 conducts reception processing of a broadcast program via the antenna 131. At step 1502, a decision is made whether the broadcast program subjected to the reception processing in the broadcast reception unit 132 is 3D contents or 2D contents.

If the broadcast program is judged to be 2D contents at the step 1502, then the processing proceeds to step 1508 and the received broadcast program is reproduced.

If the broadcast program is judged to be 3D contents at the step 1502, then the processing proceeds to step 1503 and a decision is made whether the 3D contents are contents which require chasing reproduction (time shift reproduction). For example, in the case of broadcast contents in which the real time property is made much of, such as news and on-the-spot broadcasting, there is also a possibility that users who think that the chasing reproduction is unsuitable will exist. The decision whether chasing reproduction is necessary may be adapted to be conducted on the basis of a genre of the program identified from, for example, meta data or the like contained in the broadcast program. (For example, if the genre of the program is news, chasing reproduction is judged to be unnecessary.) By the way, "chasing reproduction" means reproducing while recording a broadcast program.

If chasing reproduction is judged at the step 1503 to be unnecessary, then the received broadcast program is reproduced intact. By the way, a configuration in which a guide concerning the 3D viewing requisite is displayed concurrently with reproduction of the broadcast program may be formed.

If chasing reproduction is judged at the step 1503 to be necessary, then the processing proceeds to step 1504 where storage of the received program into the temporary storage unit 133 is started, and the processing proceeds to step 1505.

At step 1505, guide display concerning the 3D viewing requisite is conducted and the processing proceeds to step 1506. As for the guide display, the method (for example, that represented by the flow in FIG. 2) described in the first embodiment should be used. In FIG. 2, the reproduction instruction given by the user is regarded as the starting point. In the present embodiment, however, reception of 3D contents should be regarded as the starting point instead of the reproduction instruction given by the user. And a reproduction instruction given by the user the second time (a reproduction instruction after the guide display) in FIG. 2 should be regarded as the user's reproduction instruction at step 1506 described later.

At step 1506, a decision is made whether an instruction of contents reproduction is given by the user. If an instruction of reproduction is given by the user, the processing proceeds to step 1507 and reproduction of the contents stored in the temporary storage unit 133 is started.

Among the steps described above, the step 1503 may be omitted. Furthermore, the step 1504 and the step 1505 may be inverted in the order or may be conducted at the same time.

In the present embodiment, the configuration in which the temporary storage unit 133 is provided has been described. In an alternative configuration, however, internal or exterior storage media for storing contents are provided and chasing reproduction is conducted by using the storage media.

Even if the user is not ready for viewing a 3D video when 3D contents are received via a broadcast wave, it becomes possible in the present embodiment to view the 3D video from the beginning of the received 3D contents by conducting chasing reproduction on the received 3D contents.

It is also possible to form a configuration in which the temporary storage unit 133 is not provided and upon receiving 3D contents guide display concerning the 3D viewing requisite is conducted (guide display determined according to a method described in the first embodiment (with reference to, for example, the flow chart shown in FIG. 2). In FIG. 2, the reproduction instruction given by the user is regarded as the starting point. In a configuration which is desirable here, reception of 3D contents is regarded as the starting point instead of the reproduction instruction given by the user and the received 3D contents are reproduced without waiting a reproduction instruction given by the user the second time. In this case, there is a feat that a video of the beginning part of the received 3D contents might not be able to be viewed as a 3D video. However, it becomes possible to inform the user that the received contents are 3D contents.

If the time when 3D contents are broadcast can be identified on the basis of information in, for example, an Electronic Program Guide (EPG), it is possible to form a configuration in which a guide concerning a 3D viewing requisite determined according to a method described in the first embodiment (with reference to, for example, the flow chart shown in FIG. 2) is displayed a predetermined time before (for example, five minutes before) the time when 3D contents are broadcast. In FIG. 2, the reproduction instruction given by the user is regarded as the starting point. In a configuration which is desirable here, a predetermined time before broadcasting of 3D contents is regarded as the starting point instead of the reproduction instruction given by the user and the received 3D contents are reproduced without waiting a reproduction instruction given by the user the second time.

In this case, it becomes possible to prompt the user to make preparations for 3D video viewing before reproduction of the received 3D contents even if the temporary storage unit 133 is not provided.

The present embodiment has been described by taking transmission of contents using the broadcast wave as an example. However, the present embodiment is not restricted to this. Even in the broad cast using another method, such as, for example, broadcast utilizing an Internet line (IP broadcast), similar effects are obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video display system comprising:
    a source device that reproduces and outputs content through an HDMI cable; and
    a display device that displays the content output from the source device through the HDMI cable,
    wherein, when the display device receives a 3D content from the source device through the HDMI cable and changes from a 2D displaying state to a 3D displaying state, the display device provides a guidance to prompt a user to make preparations for viewing the 3D content and transmits a message for halting reproduction of the 3D content to the source device through the HDMI cable,
    after the source device receives the message for halting reproduction of the 3D content from the display, the source device halts reproduction of the 3D contents, after being instructed or operated to reproduce the 3D content by a user after the source device halts the reproduction of the 3D content by the message for halting reproduction of 3D content, the display device transmits a message for reproducing the 3D content to the source device through the HDMI cable, and after the source device receives the message for reproducing the 3D content from the display device, the source device reproduces and outputs the 3D content to the display device through the HDMI cable.

2. The video display system according to claim 1, wherein after being instructed or operated to reproduce the 3D content by a user, the presentation of the guidance is erased on the display device.

3. The display device according to claim 1, wherein the display device does not provide the guidance, if the display device is already in the 3D displaying mode when display device receives the 3D content.

4. A display device comprising:
a video reception unit that receives a content output from a source device through an HDMI cable;
a display unit that displays the received content by the video reception unit;
a communication unit that communicates a message with the source device through the HDMI cable; and
a control unit, wherein:
when the video reception unit receives a 3D content and the display unit changes from a 2D displaying state to a 3D displaying state, the control unit provides a guidance to prompt a user to make preparations for viewing the 3D content and the communication unit transmits a message for halting reproduction of 3D content to the source device through the HDMI cable, and
after being instructed or operated to reproduce the 3D content by a user after transmitting the message for halting reproduction of 3D content, the communication unit transmits a message for reproducing the 3D contents to the source device through the HDMI cable.

5. The display device according to claim 4, wherein after being instructed or operated to reproduce the 3D content by a user, the presentation of the guidance is erased on the display unit.

6. The display device according to claim 4, wherein the control unit does not provide the guidance, if the display device is already in the 3D displaying mode when display device receives the 3D content.

7. A source device comprising:
a receiver that receives content;
a storage unit that stores the received content;
a decoder that decodes the content received by the receiver or the content stored in the storage unit;
a video transmission unit that transmits the content decoded by the decoder to a display device through an HDMI cable; and
a communication unit that communicates a message with a display device through the HDMI cable, wherein:
where the content received by the receiver is 3D content that includes a 3D video and the received content is determined to require a time shift reproduction, the storage units starts to store the received content, and
after the communication unit receives a message for reproducing the stored content or a message indicating that the display device is in a state capable of displaying a 3D video from the display device through the HDMI cable, the content stored in the storage unit is reproduced by a time shift reproduction, the reproduced content is decoded by the decoder and then the video transmission unit transmits the decoded content to the display device through the HDMI cable.

8. The source device according to claim 7, wherein if the 3D content is in a predetermined genre, then the 3D content received by the receiver is decoded by the decoder and the decoded content is output from the output to the display device.

* * * * *